United States Patent [19]

Iida et al.

[11] Patent Number: 4,685,786
[45] Date of Patent: Aug. 11, 1987

[54] EXPOSURE CONTROL DEVICE FOR CAMERA

[75] Inventors: Yoshikazu Iida, Chigasaki; Kenji Ishizuki, Tokyo, both of Japan

[73] Assignee: Nippon Kogaku K. K., Tokyo, Japan

[21] Appl. No.: 846,235

[22] Filed: Mar. 31, 1986

[30] Foreign Application Priority Data

Apr. 15, 1985 [JP] Japan .................................. 60-79769

[51] Int. Cl.⁴ .......................... G03B 7/24; G03B 7/099
[52] U.S. Cl. ........................................ 354/21; 354/480
[58] Field of Search ................................. 354/21, 480

[56] References Cited

U.S. PATENT DOCUMENTS 3,687,026 8/1972 Kobayashi et al. ................. 354/480
3,730,063 5/1973 Kobayashi et al. ................. 354/480
4,072,961 2/1978 Yamada ............................... 354/480
4,598,986 7/1986 Shiratori et al. ...................... 354/21

Primary Examiner—Russell E. Adams
Attorney, Agent, or Firm—Shapiro and Shapiro

[57] ABSTRACT

An exposure control device for a camera is so structured that the film information recorded on the film or the cartridge is read, the reflection coefficient of the loaded film is determined based on the read film information and the termination of light emission of an electronic flash device or the start of run of a shutter curtain is controlled in accordance with the reflection coefficient so that the proper exposure is always obtained by the light emission control or the shutter control by the TTL direct light detection irrespective of the change of the reflection coefficient of the film.

5 Claims, 4 Drawing Figures

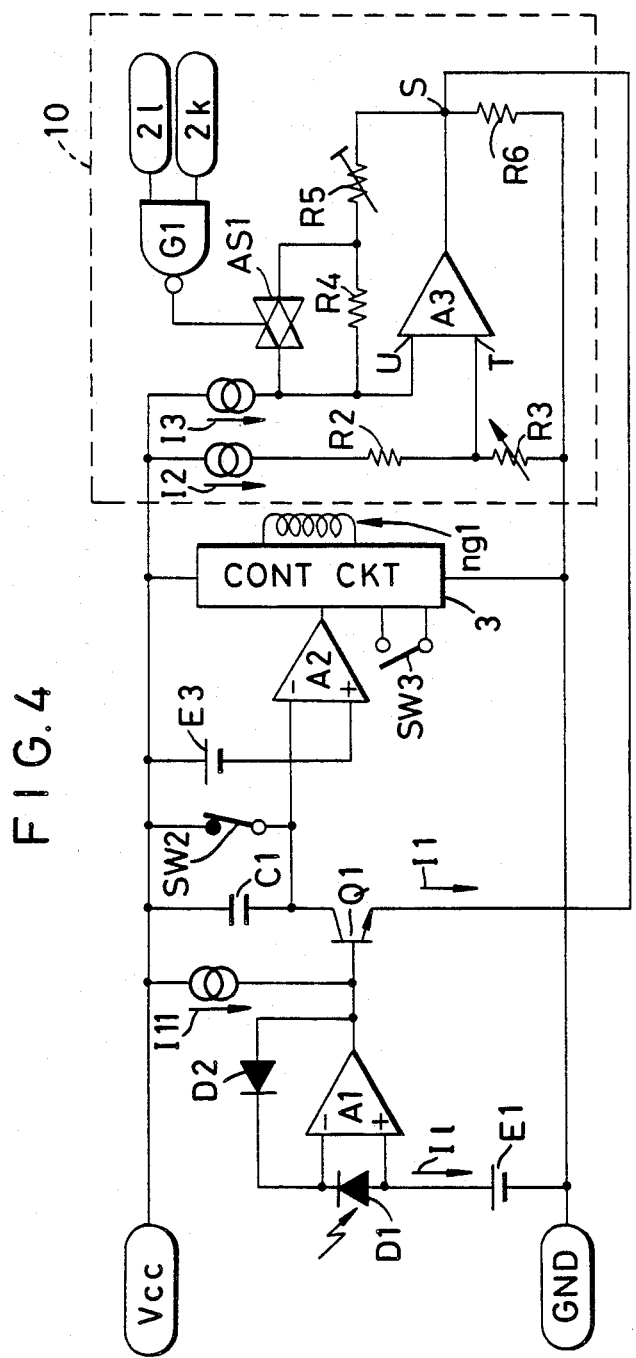
F I G. 4

EXPOSURE CONTROL DEVICE FOR CAMERA

BACKGROUND OF THE INVENTION

1. Field of the Invention

The present invention relates to an exposure control device for a camera which detects a light reflected by a film surface after it has passed through an imaging lens in a normal photographing mode or flash photographing mode and controls the exposure based on the detected light.

2. Related Background Art

A light emission control system of an electronic flash device by a TTL (through-the-lens) direct light detection in which a light transmitted through a photographic lens is reflected by a film surface and a light emission duration of the electronic flash device is controlled in accordance with an integration of the reflected light so that the light emission is controlled has been commonly used as a control system for the light emission in flash photographing.

In this light emission control system by the TTL direct light detection, the light transmitted through the lens is detected. Thus, a precision of light emission control is higher than that of an external light emission system in which the light is detected by a photo-detector provided in a body of the electronic flash device to control the light emission. The TTL direct light system in very effective to proximate photographing.

However, since the light emission control system by the TTL direct light detection utilizes the reflection light from the film surface, the light emission characteristic varies with a reflection coefficient of the film which varies by a type of the film. Thus, proper exposure is obtained for a film of one type but the exposure may be over or under for a film of other type having the same film sensitivity.

For example, the reflection coefficients of a negative film and a positive film are different even if the film sensitivities are same. If the camera is set such that a proper exposure is obtained for the negative film, an overexposure results in for the positive film because the reflection coefficient of the positive film is lower.

This problem is applicable to not only the light emission control is the flash photographing mode by the TTL direct light detection but also the shutter control by the TTL direct light detection in the normal light photographing mode. If the reflection coefficients are different between different types of film although they have the same film sensitivity, a proper exposure may not obtained.

SUMMARY OF THE INVENTION

A film having film information such as film sensitivity and film latitude recorded on the film or a cartridge in which the film is accommodated has been put into practice.

Accordingly, it is an object of the present invention to provide an exposure control device which determines a reflection coefficient of a film surface based on film information read from a film so that proper exposure is always obtained by TTL direct light detection irrespective of a type of the film.

In order to achieve the above object, in accordance with the present invention, the film information recorded on the film or the cartridge is read, the reflection coefficient of the loaded film is determined based on the read film information, and the termination of light emission of an electronic flash device or the start of run of a shutter certain is controlled in accordance with the reflection coefficient so that the proper exposure is always obtained by the light emission control or the shutter control by the TTL direct light detection irrespective of the change of the reflection coefficient of the film.

BRIEF DESCRIPTION OF THE DRAWINGS

FIG. 4 shows a circuit diagram of another embodiment of the present invention which controls a shatter speed.

DESCRIPTION OF THE PREFERRED EMBODIMENTS

Figure 1:
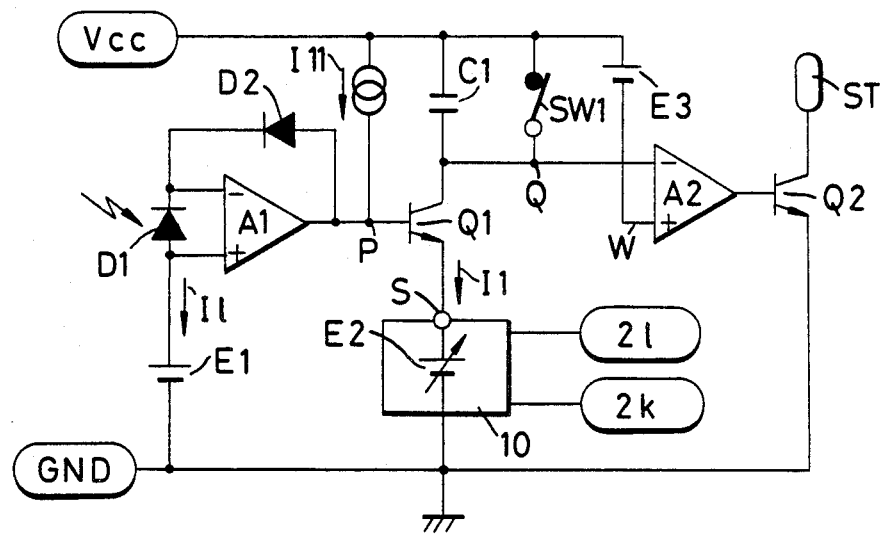
FIG. 1 shows a circuit diagram of one embodiment of the present invention which controls the light emission of the electronic flash device

FIG. 1 shows a circuit diagram of one embodiment of the present invention which controls light emission of an electronic flash device by TTL direct light detection.

D1 denotes a light emission control photo-detector for detecting a reflection light from a film surface, D2 denotes a logarithmic compression diode, A1 denotes an operational amplifier, E1, E2 and E3 denote reference voltage sources, C1 denotes an integration capacitor, A2 denotes a comparator, and Q1 and Q2 denote NPN transistors. This circuit has been known as a light emission stop signal generation circuit which generates a light emission stop signal in accordance with an integration of the reflection light from the film detected by the TTL direct light detection. The stop signal is generated at a terminal ST. In the present invention, the reference voltage E2 is changed by a circuit block 10 in accordance with a reflection coefficient estimated based on film latitude information of the film information recorded on the film cartridge so that the light emission of the electronic flash device is stopped to provide a proper exposure irrespective of the change of the film type. The circuit block 10 has terminals $2l$ and $2k$ from which the latitude information read from the film cartridge is supplied.

The operation of the circuit of FIG. 1 is now explained. When a shutter release button is depressed, a shutter leading curtain is moved and an X-contact (not shown) is turned on. Thus, the electronic flash device is fired and an emitted light is reflected by an object, passes through the lens of the camera and is directed to the film surface. The light is further reflected by the film surface and directed to the light emission control photo-detector D1, through which a photo-current I1 proportional to the intensity of the incident light flows. The photo-current I1 flows to the logarithmic compression diode D2 and a potential representing a magnitude of the photo-current I1 appears at the point P which is the output terminal of the operational amplifier A1. A current I1 which flows through the transistor Q1 is determined by the potential at the point P and the reference voltage E2. As the switch SW1 is turned off upon turn-on of the X-contact, a charge stored in the integration capacitor C1 is proportional to the integration of the photo-current I1. When the voltage across the integration capacitor C1 exceeds the potential of the reference voltage source E3, the output of the comparator A2 changes to the H-level and the transistor Q2 is turned on so that the stop signal is generated and the light emission of the electronic flash device, which accords with U.S. Pat. No. 4,519,683, is stopped. But, it is necessary to transmit the stop signal to the electronic flash device through an inverter.

In order to compensate for the change of the light emission characteristic due to the change of the reflection coefficient of the film surface, the reference voltage E2 is changed in the embodiment of FIG. 1. Alternatively, the reference voltage E1 or E3 may be changed or the capacitance of the integration capacitor C1 may be changed.

Another embodiment in which the reference voltage E2 is changed in accordance with the reflection coefficient of the film surface by the circuit flash 10 is now explained.

Figure 2:
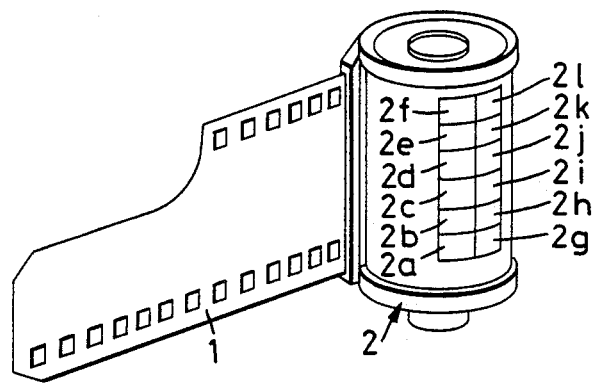
FIG. 2 shows a perspective view of a film cartridge having film information recorded thereon.

FIG. 2 shows a perspective view of a film cartridge having film information including a film sensitivity, the number of frames of the film and a latitude of the film recorded thereon, used for the camera having the exposure control device of the present invention. In FIG. 2, a film is accommodated in a film cartridge 2 and information signal codes for the film 1 are recorded on the film cartridge 2. The information signal codes include areas 2a–2l which are either metal surfaces (conductive surfaces) or insulative surfaces. The areas 2b–2f represent the film sensitivity, the areas 2h–2j represent the number of frames of the film, and the areas 2k–2l represnt the film latitude, in binary codes. The areas 2a and 2g are common electrodes which are used to determine whether the areas 2b–2f and 2h–2l are conductive surfaces or insulative surfaces.

In the present embodiment, the film latitude information represented in the binary codes in the areas 2l and 2k of the film information recorded in the binary codes on the film cartridge 2 are read to determine the reflection coefficient of the film 1.

The film latitude information represented by the areas 2l and 2k is given as follows.

| Latitude | 2k | 2l |
|---|---|---|
| ±½ (EV) | H | H |
| ±1 | L | H |
| +2 -- 1 | H | L |
| +3 -- 1 | L | L |

(H): Insulative surface
(L): Conductive surface

In the above table, H represents that the areas 2k and 2l which represent the latitude information in binary forms are insulative surfaces, and L represents that they are conductive surfaces. In the present embodiment, the film information read means may be a detector which electrically detects the film information such that the H-level is produced when the areas 2k and 2l are insulative surfaces and the L-level is produced when they are conductive surfaces.

A principle of compensation for the light emission characteristic by the TTL direct light detection by utilizing the film latitude information shown in the above table is now explained.

The film information recorded on the film cartridge shown in FIG. 2 does not include information on the type of film, that is, negative film or positive film, and information on the reflection coefficient of the film and hence the type of film and the reflection coefficient of the film cannot be determined by reading the film information. Thus, in order to determined the type of film, the property that the positive film usually has a narrow latitude and the negative film usually has a wide latitude is utilized. In the latitude information shown in the above table, it is considered that the film having the latitude information of ±½ Ev is the positive film and the film having the latitude information of ±1 EV or higher is the negative film. In this manner, the positive film and the negative film are discriminated based on the latitude information. It is known that the reflection coefficient of the positive film is lower than that of the negative film. Thus, the reflection coefficients of the positive films and the negative films are statistically determined and the reference voltage E2 of the circuit block 10 in the circuit of FIG. 1 is changed in accordance with the reflection coefficient of the film thus estimated so that the exposure can be compensated in accordance with the reflection coefficient of the film.

Figure 3:
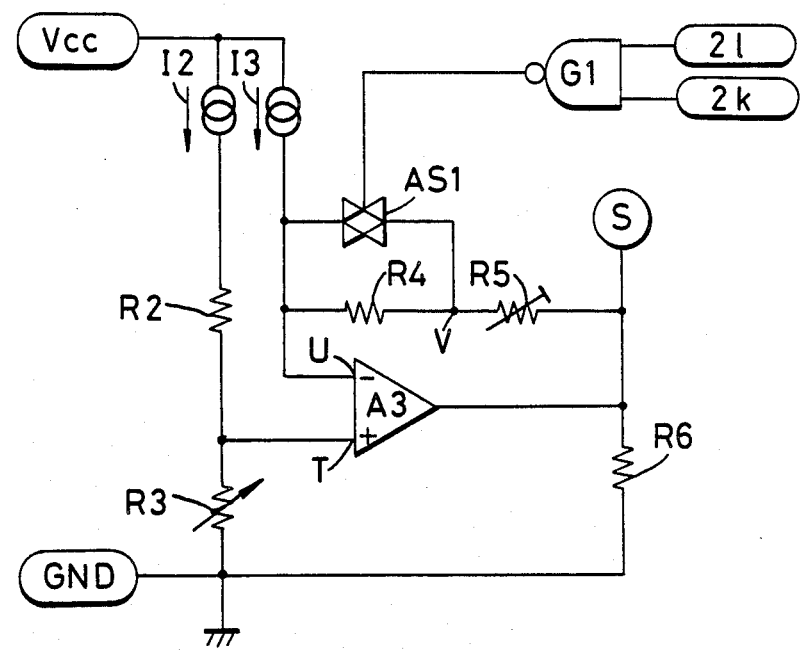
FIG. 3 shows a specific circuit of a portion 10 of FIG. 1.

FIG. 3 shows a specific circuit of the circuit block 10 in the embodiment of FIG. 1.

In FIG. 3, A3 denotes an operational amplifier, R2 to R6 denote resistors, AS1 denotes an analog switch, G1 denotes a NAND gate, I2 and I3 denote constant current sources, and 2l and 2k denote terminals which are contacted to the information code areas 2l and 2k of the film cartridge 2 shown in FIG. 2 to detect the H-level or L-level signal.

The operation of the circuit of FIG. 3 is now explained.

If the film loaded to the camera is the negative film, at least one of the terminals 2k and 2l is at the L-level as seen from the above table. Thus, the output of the NAND gate G1 is of H-level and the analog switch AS1 is turned on. Accordingly, the potential at the point S is equal to a potential Vt at the point T (which is equal to a potential Vu at the point U) less I3·R5, that is, (Vt−I3·R5).

On the other hand, if the film is the positive film, the terminals 2l and 2k are both H-levels as seen from the above table and the output of the NAND gate G1 is L-level and the analog switch ASI is turned off. As a result, the potential at the point S is equal to Vt−I3 (R5+R4), which is lower than that for the negative film by I3·R4.

As the potential at the point S drops, the current I1 flowing through the transistor Q1 in FIG. 1 increases and the time required for the voltage across the integration capacitor C1 reaches the potential of the reference voltage source E3 is shortened. If the incident light density to the photo-detector D1 is constant, the timing at which the stop signal to stop the light emission of the stroboscope is produced is earlier for the positive film than for the negative film.

In this manner, by determining the type of film based on the latitude information read from the film cartridge 2, the light emission characteristic can be automatically compensated such that a proper exposure is always attained irrespective of the change of the reflection coefficient due to the change of the film change.

In the above embodiment, the compensation by the latitude information read from the film cartridge is effected in two steps although it may be effected in more steps. In the above embodiment, the correction amount is determined only based on the latitude information, although it may be determined by a statistic method by combining the film sensitivity information and the latitude information to attain finer compensation.

FIG. 4 shows a circuit diagram of other embodiment of the present invention. In the present embodiment, a shutter speed is controlled in accordance with the direct light detection in a normal light photographing.

In FIG. 4, SW4 denotes a switch which is turned off in synchronism with the open operation of the shutter leading curtain. Numeral 3 denotes a known shutter control circuit. The control circuit energizes a shutter trailing curtain lock magnet Mgl in response to the closure of a switch SW3 which is turned on immediately before the actuation of the shutter leading curtain, and deenergizes the shutter trailing curtain lock magnet Mgl when a signal from a compasator A2 changes to the H-level. As the shutter trailing curtain lock magnet Mgl is deenergized, the shutter trailing curtain is released and the shutter trailing curtain starts to move. Other circuit blocks are identical to those of FIGS. 1 and 3 and they are designated by the like symbols.

The operation of the circuit of FIG. 4 is explained. When a release button (not shown) of the camera is depressed, the switch SW3 is turned on and the shutter control circuit 3 energizes the shutter trailing curtain lock magnet Mgl so that the shutter trailing curtain is locked. When the shutter leading curtain starts the movement to start the exposure, the switch SW2 is turned off. As the switch SW2 is turned off, the light which passed through the lens and reflected by the film surface is directed to the photo-detector D1 and the photocurrent I1 proportional to the incident light intensity flows. A charge proportional to the integration of the photo-current I1 is stored in the integration capacitor C1. When the voltage across the integration capacitor C1 exceeds the potential of the reference voltage source E3, the output of the comparator A2 changes from the L-level to the H-level. The shutter control circuit 3 deenergizes the shutter trailing curtain lock magnet Mgl in response to the H-level output of the comparator A2, the shutter trailing curtain is moved to terminate the exposure.

Since the emitter voltage of the transistor Q1 is controlled by the circuit block 10 as is done in the embodiments of FIGS. 1 and 3, the gain of the output current I1 for the photo-current I1 is changed in accordance with the latitude signal applied to the terminals 2l and 2k.

Thus, in the shutter control by the direct light measurement in the normal light photographing, the shutter speed is controlled to attain the proper exposure by estimating the reflection coefficient of the film loaded in the camera based on the latitude information of the film as is done in the stroboscope light emission control by the TTL direct light detection.

In the above two embodiments, the latitude information is read from the cartridge 2 in which the film is accommodated. If the latitude information is recorded on the film 1 itself, the latitude information may be read from the film itself.

In the above description, the film reflection coefficient is determined based on the film latitude information and/or film sensitivity information, although the present invention is not limited thereto but the film reflection coefficient of the film loaded in the camera may be determined based on any other film information representing the film reflection coeffcient. Such film information is recorded on the film itself or the film cartridge.

As described hereinabove, in accordance with the present invention, the film reflection coefficient is determined based on the information of the film loaded in the camera and the exposure is controlled in accordance with the film reflection coefficient. Thus, even if the light intensity of the reflected light changes from film to film, the exposure is controlled in accordance with the reflection coefficient.

We claim:

1. An exposure control device for a camera comprising:
   a photo-detector for detecting a light which passes through an imaging lens and is reflected by a film surface;
   control means for controlling exposure of the film in accordance with the output of said photo-detector;
   read means for reading information on a film latitude from the film or a cartridge in which the film is accommodated; and
   correction means for correcting the exposure controlled by said control means by determining a reflection coefficient of the film loaded in the camera based on the information of the latitude read by said read means.

2. An exposure control device for a camera according to claim 1 wherein said control means controls the exposure by controlling light emission of an electronic flash device.

3. An exposure control device for a camera according to claim 2 wherein said control means controls the exposure by controlling a shutter speed.

4. An exposure control device for a camera according to claim 1 wherein said read means reads the information on a film sensitivity from the film or the film cartridge when the film is loaded to the camera, and said correction means controls the exposure controlled by said control means based on the information on the film sensitivity and the information on the film latitude.

5. An exposure control device for a camera comprising:
   a photo-detector for detecting a light which passes through an imaging lens and is reflected by a film surface;
   control means for controlling exposure to the film in accordance with a detection output of said photo-detector;
   read means for reading information of a film from the film or a cartridge in which the film is accommodated; and
   correction means for correcting the exposure controlled by said control means by determining a reflection coefficient of the film loaded in the camera based on the information read by said read means.

* * * * *